(12) United States Patent
Kodama (10) Patent No.: US 11,953,463 B2
(45) Date of Patent: Apr. 9, 2024

(54) METHOD OF PRODUCING GAS SENSOR ELEMENT

(71) Applicant: DENSO CORPORATION, Kariya (JP)

(72) Inventor: Kazutoshi Kodama, Kariya (JP)

(73) Assignee: DENSO CORPORATION, Kariya (JP)

( * ) Notice: Subject to any disclaimer, the term of this patent is extended or adjusted under 35 U.S.C. 154(b) by 414 days.

(21) Appl. No.: 17/068,278

(22) Filed: Oct. 12, 2020

(65) Prior Publication Data

US 2021/0025845 A1 Jan. 28, 2021

Related U.S. Application Data

(63) Continuation of application No. PCT/JP2019/015765, filed on Apr. 11, 2019.

(30) Foreign Application Priority Data

Apr. 12, 2018 (JP) ................................ 2018-076926

(51) Int. Cl.
*G01N 27/406* (2006.01)
*G01N 27/407* (2006.01)

(52) U.S. Cl.
CPC ..... *G01N 27/4065* (2013.01); *G01N 27/4067* (2013.01); *G01N 27/4072* (2013.01)

(58) Field of Classification Search
CPC ........... G01N 27/4065; G01N 27/4067; G01N 27/4072; G01N 27/49; G01N 27/406–41; G01N 27/48
See application file for complete search history.

(56) References Cited

U.S. PATENT DOCUMENTS

| 5,507,937 A | 4/1996 | Renz et al. |
| 6,569,303 B1 | 5/2003 | Moriguchi et al. |

(Continued)

FOREIGN PATENT DOCUMENTS

| DE | 102008040391 A1 * | 1/2010 | ......... G01N 27/4071 |
| DE | 102015212086 A1 * | 12/2016 | |

(Continued)

OTHER PUBLICATIONS

International Search Report dated Jul. 2, 2019 in corresponding PCT Application No. PCT/JP2019/015765.

*Primary Examiner* — Joshua L Allen
*Assistant Examiner* — Vivian A Tran
(74) *Attorney, Agent, or Firm* — Harness, Dickey & Pierce, P.L.C.

(57) ABSTRACT

There is provided a method of producing a gas sensor element capable of detecting a concentration of specific ions based on a limiting current passing between a first electrode and a second electrode according to a concentration difference of the specific ions. The method includes a temperature raising step, a current measuring step and a control step. In the temperature raising step, a heater is energized to raise temperature of a solid electrolyte. In the current measuring step, a voltage is applied across the first and second electrodes and to measure a limiting current. In the control step, a part of a diffusion resistance layer is removed from the gas sensor element by using an ultrashort pulsed laser to control a diffusion length that is a length of an introduction path to maintain the limiting current to be within a final standard range.

7 Claims, 10 Drawing Sheets

(56) References Cited

U.S. PATENT DOCUMENTS

| | | |
|---|---|---|
| 2003/0201193 A1 | 10/2003 | Moriguchi et al. |
| 2005/0263396 A1 | 12/2005 | Naito et al. |
| 2005/0274615 A1 | 12/2005 | Naito et al. |
| 2007/0108049 A1 * | 5/2007 | Wahl .................. G01N 27/4071 204/424 |
| 2015/0129565 A1 | 5/2015 | Gauch et al. |
| 2017/0284957 A1 | 10/2017 | Noda et al. |

FOREIGN PATENT DOCUMENTS

| | | |
|---|---|---|
| DE | 102015226343 A1 * | 6/2017 |
| JP | H07209246 A | 8/1995 |
| JP | 2001153835 A | 6/2001 |
| JP | 2005249482 A | 9/2005 |
| JP | 2006010673 A | 1/2006 |
| JP | 2006030165 A | 2/2006 |
| JP | 2007507697 A | 3/2007 |
| JP | 2015521108 A | 7/2015 |
| JP | 2015-184262 A | 10/2015 |
| JP | 2016-014615 A | 1/2016 |
| JP | 2016-050836 A | 4/2016 |
| JP | 2017-036947 A | 2/2017 |
| JP | 2018-017563 A | 2/2018 |

* cited by examiner

FIG.1

BASE-END SIDE

TIP-END SIDE

METHOD OF PRODUCING GAS SENSOR ELEMENT

CROSS-REFERENCE TO RELATED APPLICATION

The present application is a continuation application of International Application No. PCT/JP2019/015765, filed on Apr. 11, 2019, which claims priority to Japanese Patent Application No. 2018-076926, filed on Apr. 12, 2018. The contents of these applications are incorporated herein by reference in their entirety.

BACKGROUND

Technical Field

The present disclosure relates to a method of producing a gas sensor element.

Background Art

There is known a method of processing a workpiece with a laser beam. For example, a workpiece is laser-cut by using an ultrashort pulsed laser to remove portions of the workpiece in a desired geometric shape.

SUMMARY

The solid electrolyte layer can conduct specific ions in a measurement gas. The first electrode is provided to a first main surface that is a measurement gas introduction-side surface of the solid electrolyte layer. The second electrode is provided to a second main surface of the solid electrolyte layer that is a surface facing away from the first main surface. The heater is provided to be closer to the second main surface than to the first main surface for raising the temperature of the solid electrolyte layer. The diffusion resistance layer, which permits a measurement gas to permeate therethrough, is disposed in an introduction path through which the measurement gas is introduced to the first main surface where the first electrode is provided.

In the temperature raising step, the heater is energized to raise the temperature of the solid electrolyte is raised. In the current measuring step, a voltage is applied across the first and second electrodes to measure a limiting current. In the control step, a part of a diffusion resistance layer is removed from the gas sensor element by using an ultrashort pulsed laser to control a diffusion length that is the length of the introduction path to maintain the limiting current to be within a predetermined range.

BRIEF DESCRIPTION OF THE DRAWINGS

The above aim and other aims, features, and advantageous effects of the present disclosure will be made clearer by the following detailed description referring to the accompanying drawings. In the drawings.

DETAILED DESCRIPTION OF THE PREFERRED EMBODIMENTS

[PTL 1] JP 6022038 B

In PTL 1, when producing a gas sensor element, for example, it is preferred that the element be processed so that the physical quantity such as of detected current will have a desired value. However, PTL 1 does not refer to physical properties other than geometric shapes. The present disclosure aims to provide a method of producing a gas sensor element capable of reducing variation in detection value between sensor elements.

A method of producing a gas sensor element according to the present disclosure includes a temperature raising step, a current measuring step and a control step. The gas sensor element includes a solid electrolyte layer, a first electrode, a second electrode, a heater and a diffusion resistance layer, and can detect a concentration of specific ions in a measurement gas based on a limiting current passing between the first and second electrodes.

In the present disclosure, since a limiting current is measured in the current measuring step and the diffusion resistance layer is removed such that the limiting current will be in a predetermined range, variation in detection value can be reduced between gas sensor elements.

First Embodiment

Figure 1:
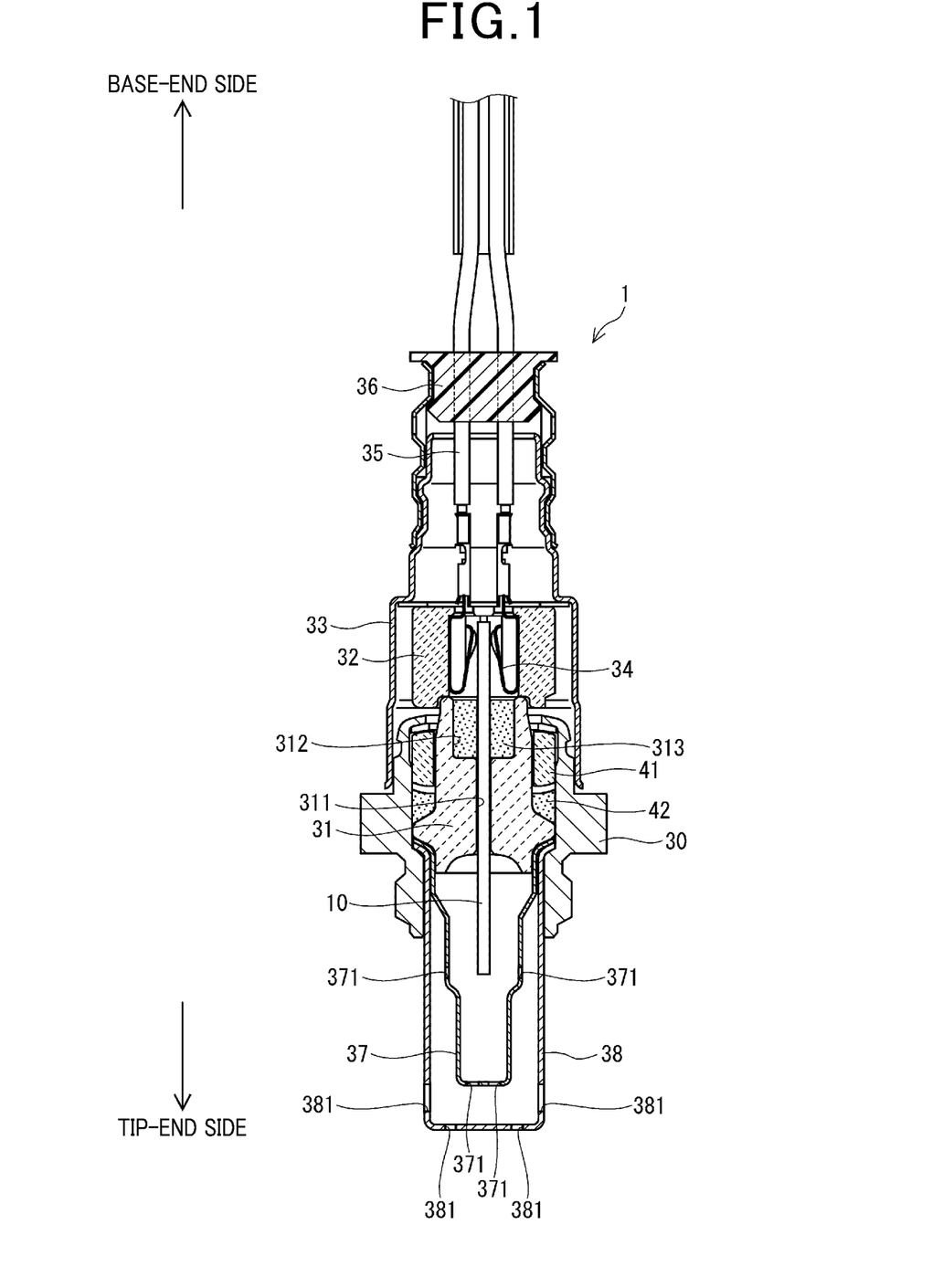
FIG. 1 is a cross-sectional view illustrating a gas sensor according to an embodiment.

Referring to the drawings, a method of producing a gas sensor element will be described. FIG. 1 shows a gas sensor 1 according to an embodiment, including a gas sensor element 10, a housing 30, a first insulator 31, a second insulator 32, a cover 33, a contact terminal 34, wire leads 35, a bush 36, an inner cover 37 and an outer cover 38. In the present embodiment, the gas sensor 1 is disposed in an exhaust pipe, not shown, of a vehicle to detect an oxygen concentration of an exhaust gas, i.e., a detection gas, by using the atmospheric air as a reference gas. Thus, the gas sensor 1 is used for detecting an air-fuel ratio of the internal combustion engine. In FIG. 1, the upper side and the lower side, as viewed in the figure, are respectively defined to be a base-end side and a tip-end side.

The housing 30 is mounted to an exhaust pipe, not shown. The first insulator 31 is disposed radially inside the housing 30 and held therein by an insulator 41 and a talc 42. The first insulator 31 is provided with an insertion hole 311 penetrating in the axial direction. The insertion hole 311 is provided with a recess 312 on the base-end side. The gas sensor element 10 is inserted into the insertion hole 311. The recess 312 is filled with glass 313, and the gas sensor element 10 is held by the first insulator 31 in a state of being protruded from the first insulator 31 on the tip-end side and the base-end side. Thus, insulation is ensured between the gas sensor element 10 and the housing 30.

The second insulator 32 is disposed on the base-end side of the first insulator 31 and holds the contact terminal 34. The cover 33 is disposed on the base-end side which is radially outside the housing 30 and holds therein the insulator 32, the contact terminal 34, the wire leads 35, and the like.

The contact terminal 34 is connected to the gas sensor element 10 and the wire leads 35. The wire leads 35 are held by the bush 36 and connected to a limiting current meter 52 and a temperature increase controller 51. The bush 36 is disposed on the base-end side of the gas sensor 1, with the wire leads 35 being inserted therethrough.

The covers 37 and 38 are disposed on the tip-end side of the housing 30. The inner cover 37 is formed into a substantially bottomed cylindrical shape with the base-end side open, and is fitted to the tip-end side of the first insulator 31. The tip-end side of the gas sensor element 10 is held in the inner cover 37. The outer cover 38 is formed into a substantially bottomed cylindrical shape with the base-end side open, and is disposed outside the inner cover 37. Thus, the tip-end side of the gas sensor element 10 is doubly covered with the covers 37 and 38. The base-end side of the outer cover 38 is fitted between the inner cover 37 and the housing 30. The covers 37 and 38 are provided with a plurality of exhaust gas inlets 371 and 381. Thus, an exhaust gas is introduced into the interior of the inner cover 37.

Figure 2:
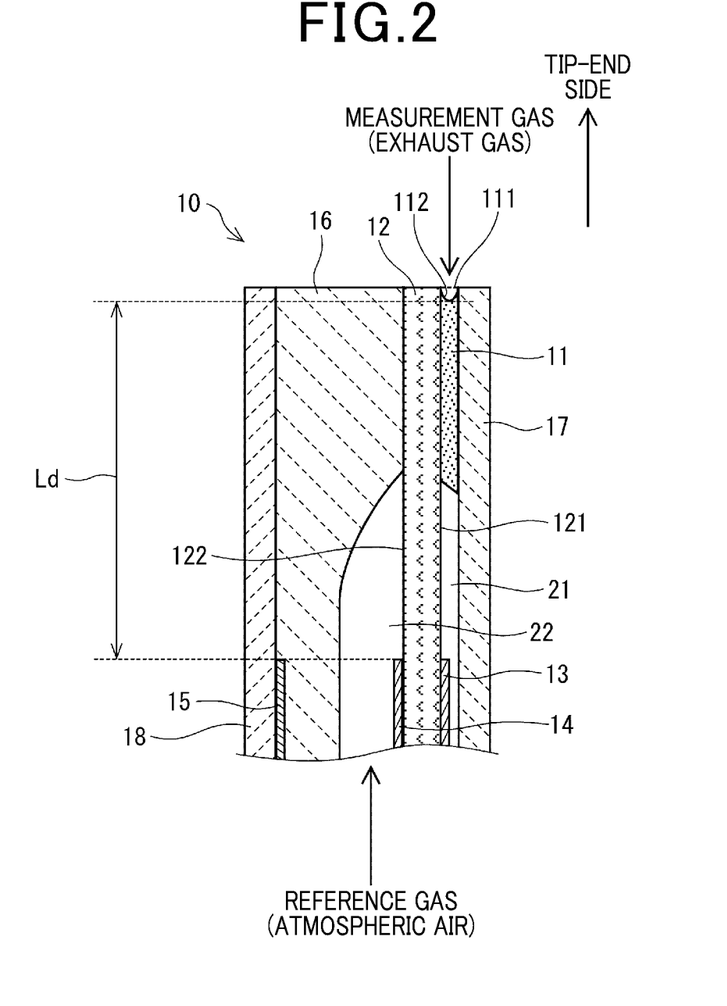
FIG. 2 is a cross-sectional view illustrating a gas sensor element according to an embodiment.

As shown in FIG. 2, the gas sensor element 10 includes a diffusion resistance layer 11, a solid electrolyte layer 12, a first electrode 13, a second electrode 14, a heater 15, an insulation layer 16, a first shielding layer 17, a second shielding layer 18 and the like, and is formed into an elongated flat shape as a whole. FIG. 2 is a schematic cross-sectional view, in which the upper side as viewed in the figure corresponds to a tip-end side. In FIG. 2, although not shown, protective layers made of a porous material and capable of permeating a detection gas therethrough may be provided outside the respective shielding layers 17 and 18. For ease of explanation, thicknesses and the like of the layers are appropriately changed in FIG. 2. The same applies to other figures.

The diffusion resistance layer 11 is disposed on the tip-end side of the gas sensor element 10 so as to be located between the solid electrolyte layer 12 and the first shielding layer 17. The diffusion resistance layer 11 is made, for example, of porous aluminum oxide ($Al_2O_3$) so that a detection gas can permeate therethrough. The diffusion resistance layer 11 has a tip-end face 111 where a recess 112 is formed. Provision of the diffusion resistance layer 11 can limit the rate of inflow of the detection gas into a detection gas chamber 21.

The solid electrolyte layer 12 is formed into a plate shape using a material having oxygen ion conductivity at an activation temperature. In the present embodiment, oxygen ions correspond to the specific ions. The solid electrolyte layer 12 is made of a material containing zirconia ($ZrO_2$) as a main component. The solid electrolyte layer 12 has a first shielding layer 17-side surface serving as a first main surface 121, and a surface facing away from the first main surface 121 serving as a second main surface 122. The first main surface 121 is provided with the first electrode 13, and the second main surface 122 is provided with the second electrode 14. The electrodes 13 and 14 are platinum electrodes. The electrodes 13 and 14 are connected to the limiting current meter 52 (see FIG. 3) via the respective wire leads 35.

On the first main surface 121, there is formed a detection gas chamber 21 which is defined by the solid electrolyte layer 12, the first shielding layer 17 and the base-end side of the diffusion resistance layer 11. A measurement gas, i.e., an exhaust gas, is introduced from the tip-end side into the detection gas chamber 21 via the diffusion resistance layer 11. On the second main surface 122, there is formed a reference gas chamber 22 which is defined by the solid electrolyte layer 12 and the insulation layer 16. The atmospheric air, i.e., a reference gas, is introduced from the base-end side into the reference gas chamber 22. The first electrode 13 is disposed in the detection gas chamber 21, while the second electrode 14 is disposed in the reference gas chamber 22. In the present embodiment, the first shielding layer 17 corresponds to the shielding layer.

The heater 15 is provided to a surface of the insulation layer 16 facing away from the solid electrolyte layer 12. The second shielding layer 18 protecting the heater 15 is also provided to the surface of the insulation layer 16 facing away from the solid electrolyte layer 12. The heater 15 is made, for example, of platinum and is connected to the temperature increase controller 51 (see FIG. 3) via the wire leads 35. The solid electrolyte layer 12 is heated to an activation temperature by energization of the heater 15, and the temperature is maintained. When there is a difference in oxygen concentration between the detection gas and the reference gas at the activation temperature, current passes between the electrodes 13 and 14. The oxygen concentration in the detection gas can be measured by detecting the current between the electrodes 13 and 14. In the following, the current passing between the electrodes 13 and 14 in proportion to the oxygen concentration is referred to as a limiting current IL.

In the present embodiment, an exhaust gas is introduced into the detection gas chamber 21 via the diffusion resistance layer 11. Since the diffusion resistance layer 11 is made of a porous material, the limiting current IL may vary due to the physical properties or the like of the diffusion resistance layer 11. The limiting current IL may also depend on a diffusion length Ld. In the present embodiment, the path extending from the recess 112 to the first electrode 13 is an introduction path, and a minimum length of the introduction path is taken to be the diffusion length Ld. In the example shown in FIG. 2, the diffusion length Ld corresponds to a length from the bottom of the recess 112 of the diffusion resistance layer 11 to the tip-end side end of the first electrode 13.

In the present embodiment, while the limiting current IL is measured at the activation temperature, the diffusion length Ld is controlled in the same system, so that the limiting current IL will be constant when a predetermined voltage is applied across the electrodes. Specifically, while the limiting current IL is measured, the diffusion resistance layer 11 is processes by using an ultrashort pulsed laser to control the diffusion length Ld. The ultrashort pulsed laser is a laser having a pulse width in the range of several picoseconds to several femtoseconds. Use of the ultrashort pulsed laser enables non-thermal processing because photon energy is not converted to heat.

Figure 3:
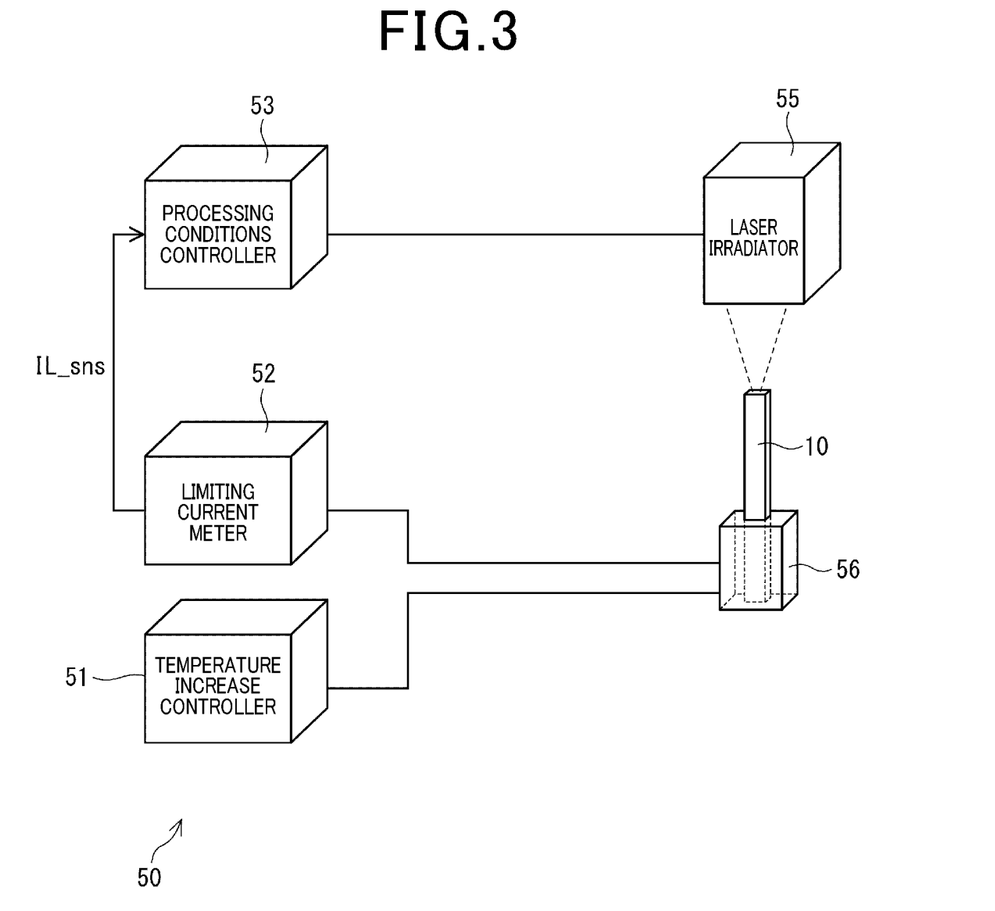
FIG. 3 is a schematic diagram illustrating a production apparatus according to an embodiment.

FIG. 3 shows a production apparatus 50 of the present embodiment, including a temperature increase controller 51, a limiting current meter 52, a processing conditions controller 53 and a laser irradiator 55. The temperature increase controller 51 controls current supply to the heater 15 to raise temperature of the heater 15 to a predetermined temperature (e.g., 950° C.) in an activation temperature range, and maintains the temperature. The limiting current meter 52 measures a limiting current IL when a predetermined voltage is applied across the electrodes 13 and 14.

The processing conditions controller 53 acquires a limiting current detection value IL_sns from the limiting current meter 52 and determines laser irradiation conditions based on the limiting current detection value IL_sns. In the present embodiment, laser fluence LF is determined based on the limiting current detection value IL_sns.

The laser irradiator 55 has an output which is variable, and irradiates the gas sensor element 10 with an ultrashort pulsed laser under the processing conditions determined by the processing conditions controller 53. The gas sensor element 10 is held by a workpiece holder 56 in a state in which the tip-end side of the gas sensor element 10 is oriented to the laser irradiator 55 so that the ultrashort pulsed laser can be applied to the tip-end face of the gas sensor element 10. In the present embodiment, a series of processes are performed, including a limiting current measuring step, a rough processing step, an intermediate processing step, and a finishing processing step. These steps are performed in one production apparatus 50 in a state in which the gas sensor element 10 is held by the workpiece holder 56 without, for example, performing a cooling step or moving the production apparatus.

Figure 4:
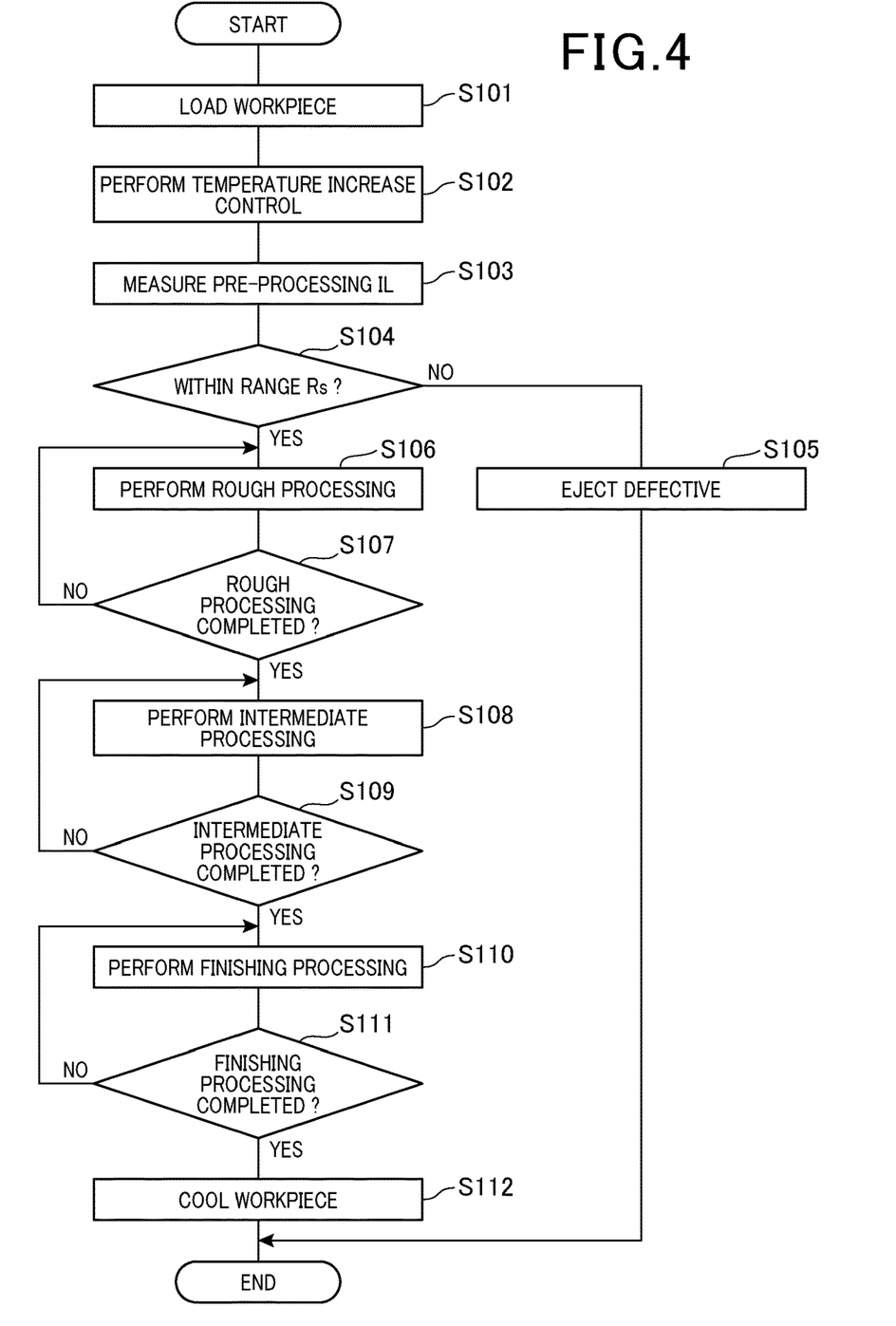
FIG. 4 is a flow chart illustrating a method of producing a gas sensor element, according to an embodiment.

Referring to a flow chart of FIG. 4, a method of producing the gas sensor element 10 of the present embodiment will be described. The processing shown in FIG. 4 is diffusion length control processing which is performed by the production apparatus 50. In the following, the gas sensor element 10 may appropriately be referred to as a workpiece. At step S101, a workpiece is loaded on the production apparatus 50.

At step S102, the temperature increase controller 51 energizes the heater 15 so that the temperature of the workpiece is controlled to a predetermined temperature. When a predetermined waiting time for temperature increase has elapsed from the start of energization, the temperature of the workpiece is taken to have reached a predetermined temperature and control proceeds to step S103. From this point onward, the temperature increase controller 51 controls current supply to the heater 15 so that the temperature of the workpiece is maintained at the predetermined temperature.

At step S103, the processing conditions controller 53 measures a limiting current IL at the time when a predetermined voltage enabling measurement of a limiting current IL is applied across the electrodes. The limiting current IL measured at step S103 is defined to be a pre-processing limiting current. At step S104, the limiting current meter 52 determines whether the pre-processing limiting current is in a pre-processing standard range Rs. If the pre-processing limiting current is determined to be outside the pre-processing standard range Rs (NO at step S104), control proceeds to step S105 where the defective workpiece is ejected. If the pre-processing limiting current is determined to be in the pre-processing standard range Rs (YES at step S104), control proceeds to step S106.

At step S106, the processing conditions controller 53 gives instructions for rough processing conditions to the laser irradiator 55. The laser irradiator 55 irradiates the workpiece with an ultrashort pulsed laser satisfying the rough processing conditions. The laser fluence LF for the rough processing conditions is determined to be a value f1. The value f1 is of a level enabling removal of the entire tip-end face 111 of the diffusion resistance layer 11 in the tip-end side end face of the gas sensor element 10.

At step S107, the processing conditions controller 53 determines whether the rough processing has been completed. In the present embodiment, if the limiting current IL shows a first standard value I1 or more, the rough processing is determined to have been completed. If the rough processing is determined not to have been completed (NO at step S107), control returns to step S106 where the rough processing is continued. If the rough processing is determined to have been completed (YES at step S107), control proceeds to step S108. It should be noted that, if the limiting current IL is greater than a second standard value I2, the intermediate processing is omitted and the finishing processing is performed.

At step S108, the processing conditions controller 53 gives instructions for intermediate processing conditions to the laser irradiator 55. The laser irradiator 55 irradiates the workpiece with an ultrashort pulsed laser satisfying the intermediate processing conditions. The laser fluence LF for the intermediate processing conditions is determined to be a value f2 which is smaller than the value f1.

At step S109, the processing conditions controller 53 determines whether the intermediate processing has been completed. In the present embodiment, if the limiting current IL is not less than the second standard value I2 which is greater than the first standard value I1, the intermediate processing is determined to have been completed. If the intermediate processing is determined not to have been completed (NO at step S109), control returns to step S108 where the intermediate processing is continued. If the intermediate processing is determined to have been completed (YES at step S109), control proceeds to step S110.

At step S110, the processing conditions controller 53 gives instructions for finishing processing conditions to the laser irradiator 55. The laser irradiator 55 irradiates the workpiece with an ultrashort pulsed laser satisfying the finishing processing conditions. The laser fluence LF for the finishing processing conditions is determined to be a value f3 which is smaller than the value f2, i.e., is of a level enabling removal of part of the tip-end face 111 of the diffusion resistance layer 11.

At step S111, the processing conditions controller 53 determines whether the finishing processing has been completed. In the present embodiment, if the limiting current IL is in a final standard range R1, the finishing processing is determined to have been completed. If the finishing processing is determined not to have been completed (NO at step S111), control returns to step 110 where the finishing processing is continued. If the finishing processing is determined to have been completed (YES at step S111), control proceeds to step S112 where the workpiece is cooled and the present processing is terminated. In the present embodiment, the final standard range R1 corresponds to the predetermined range.

Figure 5:
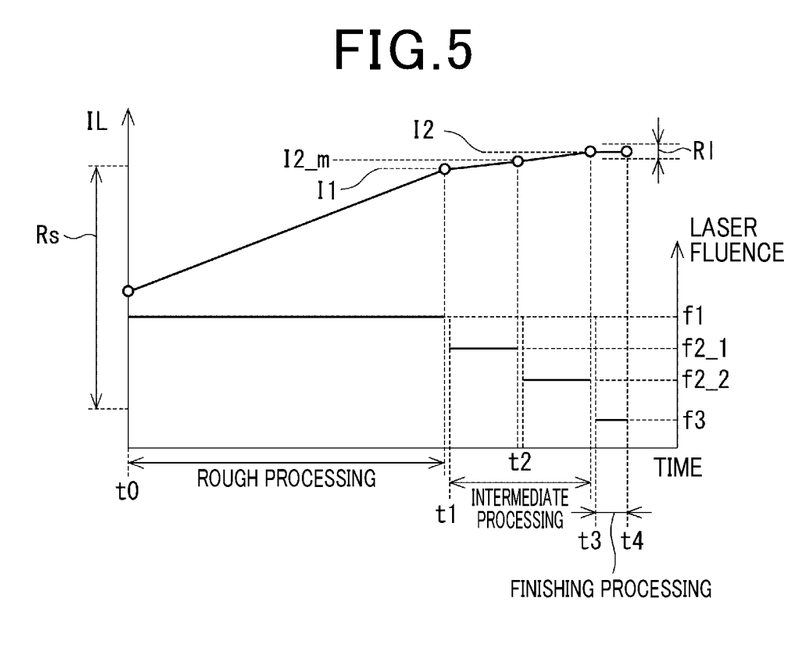
FIG. 5 is a time chart illustrating a method of producing a gas sensor element, according to an embodiment.

Referring to a time chart, diffusion length controlling processing of the present embodiment will be described. In FIG. 5, the horizontal axis represents time and the vertical axis represents limiting current and laser fluence. In the example shown in FIG. 5, the intermediate processing is divided into two stages. However, the intermediate processing may have only one stage or may have three or more stages. The rough processing step and the finishing processing step may also be divided into multiple stages. When changing processing conditions, a predetermined interval is required. However, the interval is ignored for the sake of simplifying explanation.

Figure 6:
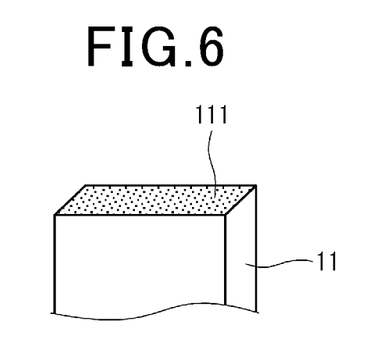
FIG. 6 is a schematic diagram illustrating a removal region of a diffusion resistance layer in a rough processing step, according to an embodiment.
Figure 7:
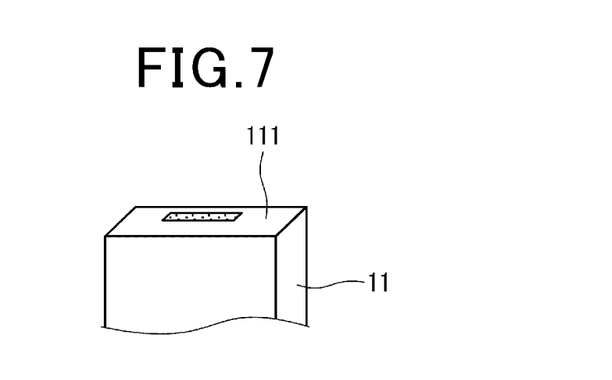
FIG. 7 is a schematic diagram illustrating a removal region of a diffusion resistance layer in a finishing processing step, according to an embodiment.

At time t0, pre-processing limiting current is in a pre-processing standard range Rs and accordingly the diffusion length controlling processing is started. Since the limiting current IL at time t0 is smaller than the first standard value I1, the laser fluence LF of the laser applied is determined to be f1. Thus, while the limiting current IL is measured, an ultrashort pulsed laser is applied to the diffusion resistance layer 11. The repetition frequency of the ultrashort pulsed laser can be determined as desired. The same applies to the intermediate and finishing processing steps. Alternatively, conditions, such as a repetition frequency, other than laser fluence may be changed for each step. As shown in FIG. 6, in the rough processing step, the tip-end face 111 of the diffusion resistance layer 11 is entirely removed. In FIGS. 6 and 7, ranges of removal with the ultrashort pulsed laser are schematically shown with dots.

At time t1 when the limiting current IL has increased to the first standard value I1 or more, the processing proceeds to the intermediate processing step in which the laser fluence LF is changed to a value f2_1 from the value f1. When the limiting current IL has increased to an intermediate standard value I2_$m$ or more, the laser fluence LF is changed to a value f2_2 from the value f2_1. The range of removal in the intermediate processing step is larger than the range of removal in the finishing processing step. The tip-end face 111 of the diffusion resistance layer 11 may be entirely or partially removed, according to the energy density of the ultrashort pulsed laser applied.

At time t3 when the limiting current IL has increased to the second standard value I2 or more, the processing proceeds to the finishing processing step in which the laser fluence LF is changed to a value f3. As shown in FIG. 7, in the finishing processing step, the tip-end face of the diffusion resistance layer 11 is partially removed. At time t4 when the limiting current IL is in the final standard range R1, application of the ultrashort pulsed laser is terminated.

In the present embodiment, the diffusion length Ld is controlled based on real time trimming. In the real time trimming, the diffusion resistance layer 11 is removed by being irradiated with the ultrashort pulsed laser while the limiting current IL is monitored. This may reduce variation in detection value between elements. Furthermore, as the limiting current IL increases, the irradiation energy is reduced accordingly. Thus, the processing time required for controlling the diffusion length dL can be reduced.

As described above, the gas sensor element 10 of the present embodiment includes the solid electrolyte layer 12, the first electrode 13, the second electrode 14, the heater 15 and the diffusion resistance layer 11, and can detect a concentration of specific ions based on the limiting current IL passing between the first and second electrodes 13 and 14. The solid electrolyte layer 12 can conduct specific ions in a measurement gas. The specific ions of the present embodiment are oxygen ions. The first electrode 13 is provided to the first main surface 121, i.e., a measurement gas introduced-side surface, of the solid electrolyte layer 12. The second electrode 14 is provided to the second main surface 122, i.e., a surface facing away from the first main surface 121, of the solid electrolyte layer 12. The heater 15 is provided to a second main surface 122 side to raise temperature of the solid electrolyte layer 12. The diffusion resistance layer 11 permitting a measurement gas to permeate therethrough is provided in a path through which the measurement gas is introduced to the part where the first electrode 13 is disposed.

The method of producing the gas sensor element 10 of the present embodiment includes a temperature raising step, a current measuring step, and a control step. In the temperature raising step, the heater 15 is energized and temperature of the solid electrolyte 12 is raised. In the current measuring step, a voltage is applied across the first and second electrodes 13 and 14, and a limiting current IL is measured. In the control step, the diffusion resistance layer 11 is removed by using an ultrashort pulsed laser to control the diffusion length Ld that is the length of the introduction path, so that the limiting current will be in the final standard range R1.

In the production method of the present embodiment, a limiting current IL is measured in the current measuring step, and the diffusion resistance layer 11 is removed so that the limiting current IL will be in the final standard range R1. Accordingly, variation in detection value between gas sensor elements 10 can be reduced.

The current measuring step is successively performed in parallel with the control step in the same production apparatus 50 in which the control step is performed. The expression "successively performed" may refer to continuously monitoring the limiting current IL, or may refer to intermittently sampling the limiting current IL at a predetermined frequency. In this way, steps are integrated and accordingly the number of production steps can be reduced, compared to the case where a current measuring step and a control step are separately performed.

In the control step, the output of the ultrashort pulsed laser is made variable according to the limiting current IL. In the present embodiment, the control step includes an entire removal step and a partial removal step. Herein, the tip-end face 111 of the diffusion resistance layer 11 irradiated with the ultrashort pulsed laser is referred to as an irradiation surface. In the entire removal step, the entire irradiation surface is removed when the limiting current IL is relatively small. In the partial removal step, the irradiation surface is partially removed when the limiting current IL is relatively large, by applying an ultrashort pulsed laser thereto with an output smaller than in the entire removal step. Thus, the production time can be reduced.

The gas sensor element 10 has the first shielding layer 17 for protecting the first electrode 13, and is provided with the detection gas chamber 21 defined by the solid electrolyte layer 12, the first shielding layer 17 and the diffusion resistance layer 11, with the first electrode 13 disposed therein. By forming the detection gas chamber 21, an exhaust gas can be promptly introduced to the first electrode 13, compared to the case where no detection gas chamber 21 is formed. Thus, a high detection rate can be achieved and accordingly, for example, an oxygen concentration in exhaust gas can be detected for each cylinder.

The gas sensor element 10 includes the insulation layer 16 between the second electrode 14 and the heater 15. The insulation layer 16 and the solid electrolyte layer 12 define the reference gas 22 for placing the second electrode 14 therein. By forming the reference gas chamber 22, the range of detection can be broadened, compared to the case where no reference gas chamber 22 is formed.

The gas sensor element 10 has a rod shape with first and second ends in a longitudinal direction thereof, and the diffusion resistance layer 11 is disposed at one of the first and second ends of the gas sensor element 10. This reduces the influence of an error that would be caused when the gas sensor 1 is assembled to an exhaust pipe, and thus measurement errors may be reduced.

In the present embodiment, step S102 corresponds to the temperature raising step, steps S103, S107, S109 and S111 correspond to the current measuring step, and steps S106, S108 and S110 correspond to the control step. Furthermore, step S106 corresponds to the entire removal step, and step S110 corresponds to the partial removal step. The temperature raising step is performed by the temperature increase controller 51, the current measuring step is performed by the limiting current meter 52, and the control step is performed by the processing conditions controller 53 and the laser irradiator 55.

Other Embodiments

Figure 8:
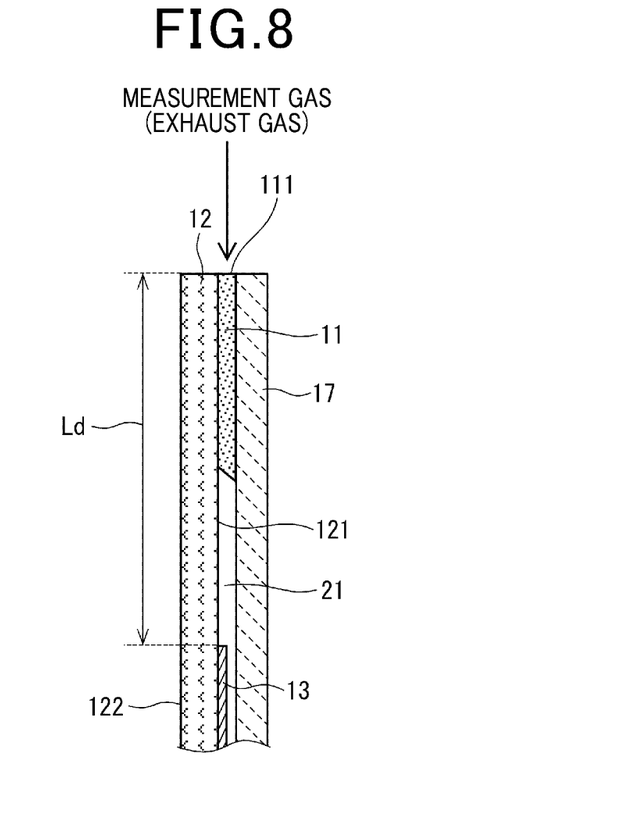
FIG. 8 is a cross-sectional view illustrating a gas sensor element according to another embodiment.
Figure 9:
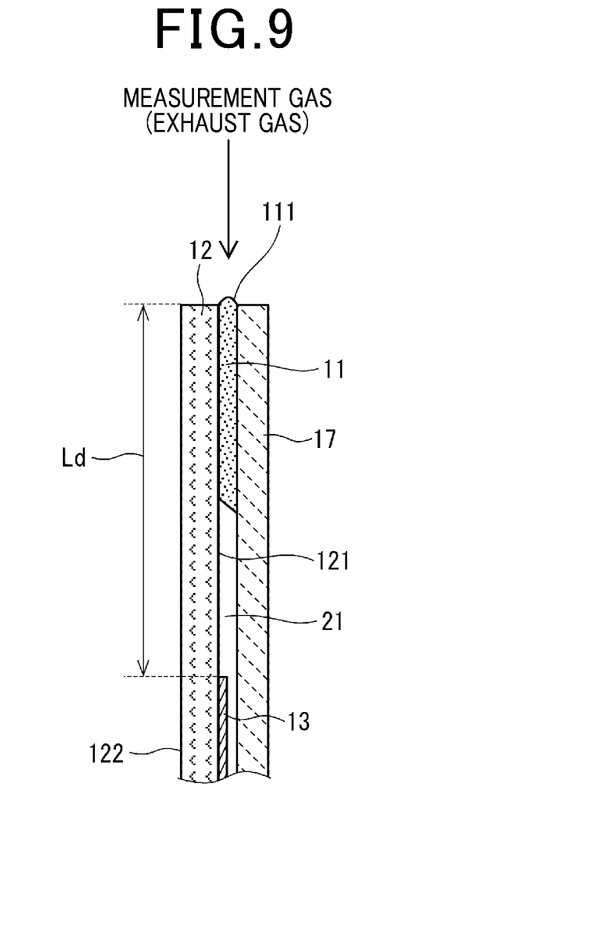
FIG. 9 is a cross-sectional view illustrating a gas sensor element according to another embodiment.
Figure 10:
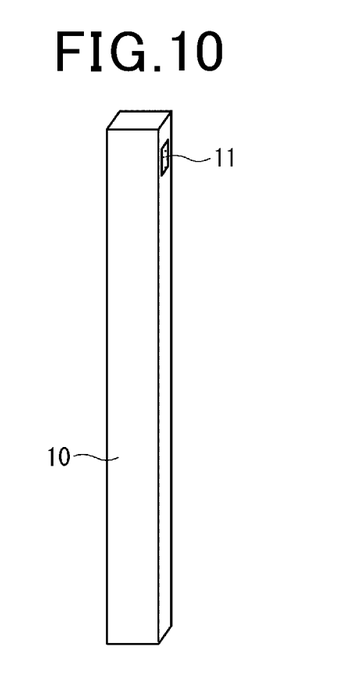
FIG. 10 is a cross-sectional view illustrating a gas sensor element according to another embodiment.

In the embodiment described above, the diffusion resistance layer 11 is provided at an end of the gas sensor element 10, and the diffusion length Ld is controlled by forming a recess 112 therein by applying an ultrashort pulsed laser. As in FIG. 8 showing another embodiment, the diffusion length Ld may be controlled by entirely removing the tip-end face 111 of the diffusion resistance layer 11. In other words, the tip-end face of the diffusion resistance layer 11 after being processed may be flat. Furthermore, as shown in FIG. 9, the diffusion length Ld may be controlled by removing the outer peripheral region of the diffusion resistance layer 11. In other words, the tip-end face of the diffusion resistance layer 11 after being processed may be protruded. In FIGS. 8 and 9, components other than the diffusion resistance layer 11, the solid electrolyte layer 12, the first electrode 13 and the first shielding layer 17 are omitted. Furthermore, as shown in FIG. 10, the diffusion resistance layer 11 may be provided to a lateral side face of the gas sensor element 10.

In the embodiment described above, the measurement gas chamber is formed between the first shielding layer and the solid electrolyte layer. In another embodiment, the first electrode may be provided being in contact with the diffusion resistance layer, without providing the measurement gas chamber. In the embodiment described above, the reference gas chamber is formed between the solid electrolyte layer and the insulation layer. In another embodiment, the second electrode may be provided being in contact with the insulation layer, without providing the reference gas chamber. The gas sensor element may have any shape. In the embodiment described above, the gas sensor element is used as an air-fuel ratio sensor. In another embodiment, the gas sensor element may be applied to other objects than air-fuel ratio sensors.

In the embodiment described above, the temperature raising step, the current measuring step and the control step are continuously performed by the same apparatus. In another embodiment, for example, the current measuring step and the control step may be performed by another apparatus and iterated. The present disclosure is not limited to the embodiment described above, but may be implemented in various modes within the scope not departing from the spirit of the disclosure.

The controller and the processes thereof described in the present disclosure may be implemented by a dedicated computer which is provided by configuring a processor and a memory that are programmed to perform one or more embodied functions by computer programs. Alternatively, the controller and the processes thereof described in the present disclosure may be implemented by a dedicated computer which is provided by configuring a processor with one or more dedicated hardware logic circuits. Alternatively, the controller and the processes thereof described in the present disclosure may be implemented by one or more dedicated computers which are configured by combining a processor and a memory that are programmed to perform one or more functions, with a processor that is configured by one or more hardware logic circuits. Furthermore, the computer programs may be stored in a computer readable non-transitory tangible storage medium, as instructions to be performed by the computer.

Although the present disclosure has been described in accordance with embodiments, it is to be understood that the present disclosure is not limited to these embodiments and structures. The present disclosure encompasses various modified examples, and alterations that come within an equivalent scope. Furthermore various combinations and forms, including combinations and forms that contain more than one or less than one of the elements, also come within the scope and conceptual range of the present disclosure.

What is claimed is:

1. A method of producing a gas sensor element, the gas sensor element including a solid electrolyte layer capable of conducting specific ions in a measurement gas, a first electrode provided to a first main surface of the solid electrolyte layer that is a measurement gas introduction-side surface, a second electrode provided to a second main surface of the solid electrolyte layer that is a surface facing away from the first main surface, a heater provided to be closer to the second main surface than to the first main surface for raising temperature of the solid electrolyte layer, and a diffusion resistance layer permitting the measurement gas to permeate therethrough and disposed in an introduction path through which the measurement gas is introduced to the first main surface where the first electrode is provided, the gas sensor element being capable of detecting a concentration of the specific ions in the measurement gas based on a limiting current passing between the first electrode and the second electrode according to a concentration difference of the specific ions, the method comprising:
a temperature raising step of energizing the heater to raise the temperature of the solid electrolyte layer;
a current measuring step of applying a voltage across the first electrode and the second electrode to measure the limiting current; and
a control step of removing a part of the diffusion resistance layer from the gas sensor element by using an ultrashort pulsed laser to control a diffusion length that is a length of the introduction path to maintain the limiting current to be within a predetermined range,
wherein in the control step, the ultrashort pulsed laser reduces an output as the limiting current increases.

2. The method of producing the gas sensor element according to claim 1, wherein the current measuring step is successively performed by a production apparatus in parallel with the control step being performed by the production apparatus.

3. The method of producing the gas sensor element according to claim 1, wherein the diffusion resistance layer has an irradiation surface that is a surface irradiated with the ultrashort pulsed laser, the control step comprises:
an entire removal step of entirely removing the irradiation surface of the diffusion resistance layer when the limiting current is smaller than a threshold value; and
a partial removal step of irradiating the irradiation surface with the ultrashort pulsed laser having an output smaller than in the entire removal step to partially remove the irradiation surface, when the limiting current is larger than or equal to the threshold value.

4. The method of producing the gas sensor element according to claim 1, wherein:
the gas sensor element includes a shielding layer protecting the first electrode; and the solid electrolyte layer, the shielding layer and the diffusion resistance layer define a detection gas chamber thereamong, the first electrode being disposed in the detection gas chamber.

5. The method of producing the gas sensor element according to claim 1, wherein:
the gas sensor element includes an insulation layer disposed between the second electrode and the heater; and
the solid electrolyte layer and the insulation layer define a reference gas chamber therebetween, the second electrode being disposed in the reference gas chamber.

6. The method of producing the gas sensor element according to claim 1, wherein the gas sensor element has a rod shape with first and second ends in a longitudinal direction thereof, and the diffusion resistance layer is disposed at one of the first or second ends of the gas sensor element.

7. The method of producing the gas sensor element according to claim 1, wherein the gas sensor element has a rod shape with a lateral side surface thereof, and the diffusion resistance layer is disposed at the lateral side surface of the gas sensor element.

* * * * *